April 6, 1937.  M. KESSLER  2,075,991
SHOCK ABSORBER
Filed June 10, 1935  2 Sheets-Sheet 1
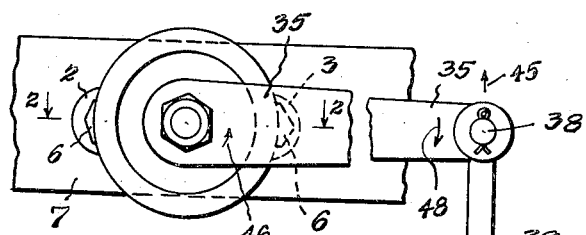
Fig.1.
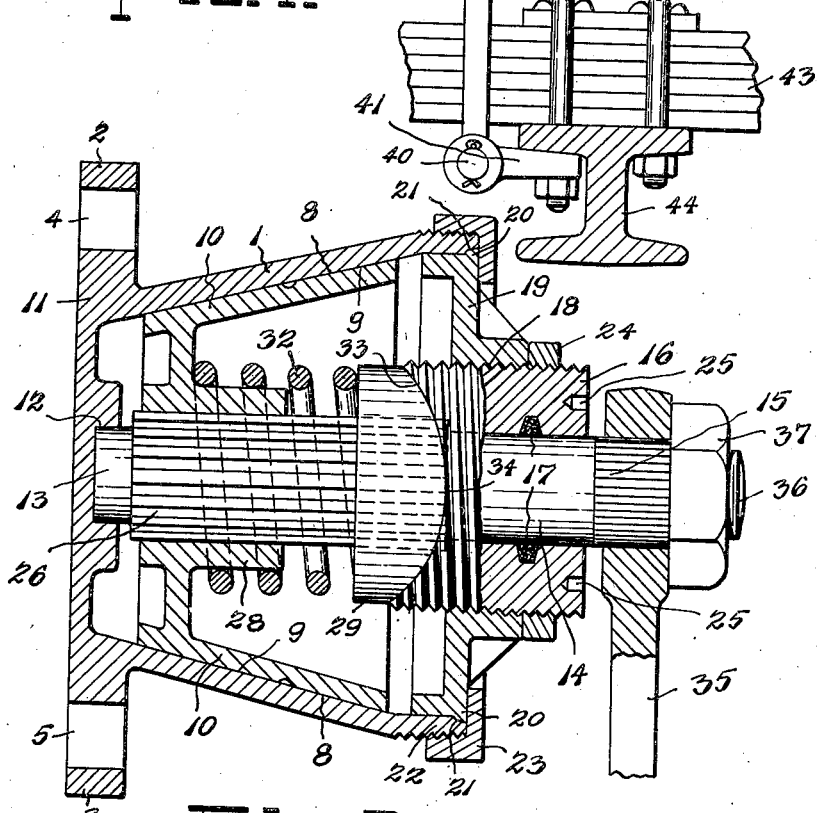
Fig.2.
Fig.7.
Inventor
MARTIN KESSLER.
By Hans G. Hoffmeister
Attorney April 6, 1937.                M. KESSLER                2,075,991
                              SHOCK ABSORBER
                           Filed June 10, 1935              2 Sheets-Sheet 2
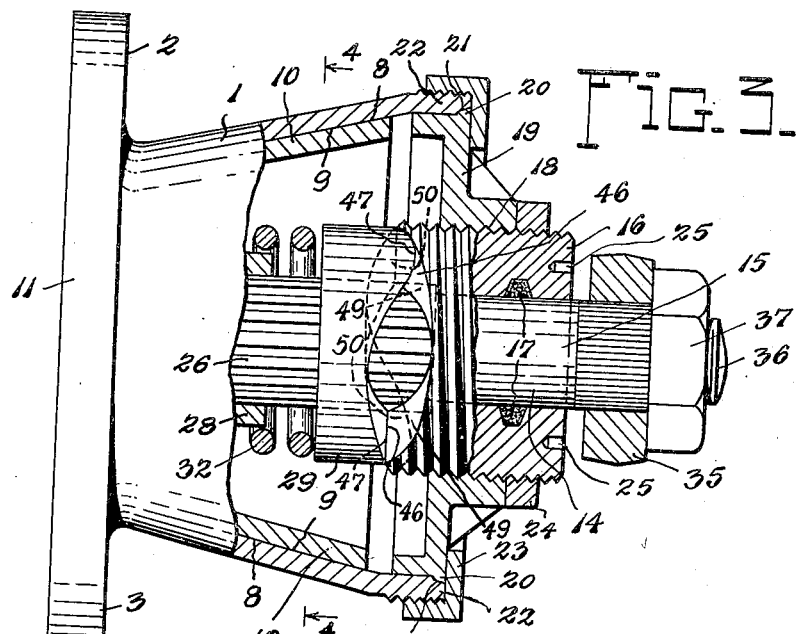
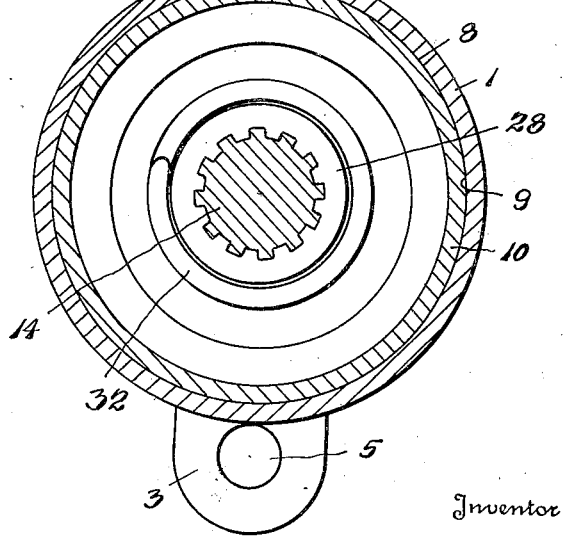
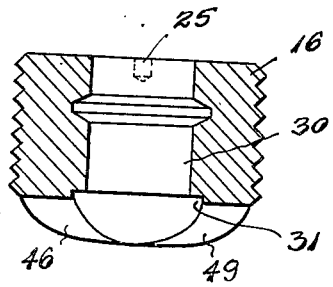
Inventor
MARTIN KESSLER
By Hans G. Hoffmeister
             Attorney Patented Apr. 6, 1937

2,075,991

UNITED STATES PATENT OFFICE 2,075,991

SHOCK ABSORBER

Martin Kessler, East Cleveland, Ohio

Application June 10, 1935, Serial No. 25,752

4 Claims. (Cl. 267—9)

Hydraulic shock absorbers are at present the most efficient means for reducing the resiliency of vehicle springs however, numerous disadvantages are inherent in these types of shock absorbers which are very difficult to overcome.

The leakage of pressure fluid from the compression cylinder of hydraulic shock absorbers requires quite often the refilling of the cylinders with compression fluid and furthermore a frequent replacement of washers, employed in such devices for providing a fluid tight seal between the respective parts thereof, is a necessity to maintain the operation of the shock absorbers most efficient.

Another disadvantage of hydraulic shock absorbers is that the resiliency of the vehicle springs under sudden impact and rebound movements cannot be gradually reduced therefore only a more or less step like shock absorbing function is obtained and the resiliency of the vehicle springs is not utilized to the extent desired.

A further disadvantage of hydraulic shock absorbers is the presence of air pockets within the fluid cylinder which give the shock absorbers a considerable amount of play during which no shock absorbing function is produced.

Furthermore in case of only slight impact and rebound movements of the vehicle springs the reduction of the resiliency of the vehicle springs increases too suddenly and similar conditions, as stated above, arise, and obviously the riding quality of a vehicle in connection with which such shock absorbers are employed, is considerably reduced.

Mechanical shock absorbers have been proposed but the problem confronted with has not been solved and a gradually increasing reduction of the resiliency of the vehicle springs proportioned in such a manner that the resilient effect of the vehicle springs is utilized to the greatest extent has not heretofore been obtained.

It is therefore the object of the present invention to provide a shock absorber construction in which the disadvantages enumerated above are entirely eliminated, and which permits the utilization of the resiliency of the vehicle springs to an extent necessary to produce the most effective shock absorbing function without impairing the riding quality of the vehicle.

This invention contemplates further the provision of a mechanical shock absorber of simple construction, which comprises only a few parts and can be cheaply manufactured, and which requires no readjustment or servicing under ordinary conditions of use.

Another object of the present invention is the provision of a shock absorber which may be readily calibrated for use with various types of vehicles and which may be adjusted for various load conditions without the necessity of varying the construction thereof to make the same adaptable for various conditions and uses.

A further object of the present invention is the provision of a shock absorber which does not only perform its function of reducing the resiliency of the vehicle springs during impact and rebound strokes but also during impact and rebound return strokes.

Other objects and advantageous features of the present invention will become apparent from the following description and accompanying drawings in which:—

Figure 1 is a view partially in elevation and partially in section illustrating how the shock absorber of the present invention may be attached to the frame and front axle of a vehicle, parts being broken away.

Figure 2 shows a longitudinal sectional view of the shock absorber housing taken on line 2—2 of Figure 1, parts being broken away.

Figure 3 illustrates a view similar to Figure 2 but showing the cam members displaced with respect to each other.

Figure 4 is a cross section of Figure 3 taken on line 4—4 of Figure 3.

Figure 5 is a longitudinal section of the stationary cam member.

Figure 6 illustrates a longitudinal section of the movable cam member.

Figure 7 shows a cross section of the movable cam member taken on line 7—7 of Figure 6.

Referring now to the drawings, and especially to Figure 2, 1 indicates the shock absorber housing which is provided with flanges 2 and 3 having holes 4 and 5 through which bolts 6 pass for securing the housing to the frame 7 constituting a part of a vehicle structure. The housing 1 is of a conical configuration and is provided with an inner friction surface 8 adapted to engage with a friction surface 9 of a friction cone member 10 arranged within the housing 1 in a manner as will be described later on.

The base portion 11 of the housing 1 is provided with a pilot bearing 12 for the reception of the end 13 of a shaft 14 the opposite end 15 of which is rotatively mounted within a stationary cam member 16 of cylindrical configuration provided with a packing 17. The outer circumference of the stationary cam member 16 is threaded and adapted to be screwed into the threaded bore 18 of a cover plate member 19 which closes the open end of the housing 1. The cover plate 19 comprises a plurality of extensions 20 provided with inclined surfaces engaging corresponding recesses 21 within the outer end wall 22 of the housing 1 so that, when the cover plate 19 is inserted into the end portion of housing 1 and secured in place by a retaining ring 23, rotation of the cover plate within the housing 1 is prevented, and likewise longitudinal movement of the latter is not possible. The engaging surfaces of members 1 and 19 are properly machined to provide a fluid tight seal.

A lock ring 24 on the stationary cam member 16, screwed tightly against the cover plate 19, prevents rotation of the stationary cam member with respect to the cover plate. Holes 25 within the stationary cam member permit the insertion of a spanner wrench, and upon loosening of lock ring 24 the stationary cam member may be adjusted with respect to the cover plate and other instrumentalities described later on.

Shaft 14 comprises a splined portion 26 engaging a correspondingly splined bore of a hub portion 28 of the friction cone member 10 previously mentioned. A movable cam 29 is secured to the splined portion 26 of shaft 14 in a similar manner as friction cone 10, and is also provided with a splined bore 29a engaging the corresponding splined shaft portion 26. It will therefore be seen that while the friction cone member 10 and the movable cam 29 are free to move longitudinally with respect to shaft portion 26, they are, nevertheless, keyed to the shaft to rotate with the same.

However it has to be noted that the shaft 14 is freely rotatable within the stationary cam 16 and that the bore 30 of said cam, as seen in Figure 5, is provided with an enlarged portion 31 which engages the outer circumference of the splined shaft portion 26 without being interlocked with the same for rotation. In other words, shaft 14 and cam 16 may be freely rotated with respect to each other. Portion 31 provides a shoulder to prevent longitudinal movement of shaft 14.

Interposed between the movable cam 29 and friction cone member 10 is a coil spring 32. Spring 32 is at all times under tension to thereby hold the cam surfaces of cam members 29 and 16 continuously in contact and to retain the friction surfaces 8 and 9 of the housing 1 and friction cone member 10 in frictional engagement. In view of the fact that member 10 is longitudinally movable on shaft 14 the spring will always urge the friction cone member in a direction to cause frictional engagement between the surfaces 8 and 9 in proportion to the force exerted by the spring. The friction between the friction surfaces may be varied as will be more fully explained while the description proceeds.

The movable cam 29 and the stationary cam 16 are provided with uniform motion cam surfaces 33 and 34. Each cam comprises two hill portions and two valley portions and the curvature of the cam portions therebetween may be equal on both cams or one pair of opposing curves on each cam member may be different from the other pair of opposing curves on each cam member so that different amounts of resistance may be created, as it is usually desirable to have less resistance against the resiliency of the vehicle spring during the impact movement thereof, while a greater amount of resistance during the rebound movement of the vehicle spring is desirable. The formation of the cam surfaces is clearly shown in Figures 3, 5 and 6.

Portion 15 of shaft 14 is provided at its end, outside of cam 16, with serrations to engage corresponding serrations within the bore of an arm 35 mounted on shaft 14. In this manner said arm and shaft are interlocked with respect to each other. The end 36 of shaft 14 is threaded for the reception of a nut 37 adapted to prevent longitudinal displacement of arm 35.

Arm 35, see Figure 1, is connected by means of pin 38 to a connecting rod 39 which in turn is connected by a pin 40 to an axle bracket 41. The axle bracket 41 is secured to the U bolt 42 of the front spring and axle assembly, the latter being of standard construction.

In a similar way the connection between the shock absorber and rear axle of a vehicle may be effected.

The housing 1 and the friction cone member 10, may be made from malleable iron, cast iron or other suitable material and the friction between the surfaces 8 and 9 can be readily maintained far below the point of seizure as will be obvious to those skilled in the art.

The operation of the device is as follows:—
With arm 35 in a position as shown in Figures 1 and 2, it will be obvious that when the wheels of the vehicle strike a protuberance of the road surface or the like, the vehicle springs, one of which is illustrated at 43, will be compressed as a result of the impact transferred to the same over axle 44. The upward movement of axle 44 and spring 43, which will be referred to herein as impact movement, causes movement of arm 35 in the direction as indicated by an arrrow 45 in Figure 1. This movement of arm 35 causes rotation of shaft 14 in a direction as illustrated by arrow 46 in Figure 1. The movable cam 29 which is keyed to shaft 14 for rotation will rotate with the latter. In view of the fact that cam 16 is stationary rotation of cam 29 with respect to said stationary cam will cause a longitudinal shifting of cam 29 toward the hub portion of the friction cone member, the amount of movement depending upon the ascent of the cam curvatures of cams 16 and 29 at 46 and 47. The longitudinal movement of cam 29 as stated above compresses coil spring 32 which in turn forces the friction cone member 10 in greater frictional engagement with the friction surface 8 of housing 1. The amount of friction created between the surfaces 8 and 9 depends upon the amount of rotation of cam 29 with respect to cam 16 and upon the ascent of the cam curvatures 46 and 47.

The friction cone member 10 rotates with shaft 14 and is therefore in rotation during the longitudinal shifting movement of cam 29.

The curvatures 46 and 47 of the cams 16 and 29 are somewhat of an elliptical configuration, and it will be seen that at the beginning of the operation explained above the longitudinal movement of the cam 29 will be rather small but will increase more rapidly toward the end of the stroke of arm 35 and will depend also upon the amount of rotation of the latter. It will therefore be seen that during the first part of the impact movement the resiliency of the vehicle spring may be fully utilized; toward the end of the impact movement the reduction of the resiliency of the vehicle spring progresses more rapidly until the impact is entirely absorbed by the combined effort of the vehicle spring and the mechanism described herein at which time the rebound movement starts.

Arm 35 swings now downwardly in the direction of arrow 48 in Figure 1 and obviously cam 29 returns first slowly and then more rapidly until arm 35 reaches the position as shown in Figure 1. Further rotation of arm 35 in the direction of arrow 48 will bring the cam surfaces 49 and 50 of cams 16 and 29 into co-action. All the parts rotate now in an opposite direction as described with respect to the impact movement. Cam 29 will be again shifted longitudinally toward the hub portion of member 10 to compress spring 32 to increase the friction between members 1 and 10 and reduce the resiliency of the vehicle spring 43 until the rebound movement is absorbed.

The ascent of the curvature of cam portions 49 and 50 is slightly larger than the ascent of the curvature of cam portions 46 and 47 so that a greater reduction of the resiliency of vehicle spring 43 will be obtained during the rebound movement of the same. This action is highly desirable to produce the most efficient riding quality of the vehicle.

It will be therefore seen from the foregoing that while the friction increases gradually and slowly at the beginning of the impact or rebound stroke of the shock absorber it increases rapidly during the end of said stroke, so that the resiliency of the vehicle springs may be fully utilized and the most effective reduction of the vehicle spring resiliency may be had at points where it is most desired.

When the vehicle travels over an even road surface and the impact transferred to the vehicle springs are only slight, the action of the shock absorber is also slight and full use of the resiliency of the vehicle springs may be had, but the moment the impact and rebound movements of the axles and springs become more violent the full and most efficient action of the shock absorber is obtained. In operation, in view of the facts explained above, the shock absorbing function of the shock absorber described herein will be uniform and smooth and the sudden operation of the devices used heretofore is entirely eliminated.

By loosening lock nut 24 and turning cam 16 the tension of spring 32 may be varied to the desired amount as will be necessary to make this shock absorber adaptable for various types of cars and various conditions of loads.

If desired, the housing 1 may be filled with lubricant as this will greatly increase the smoothness of operation of the device, although this is not absolutely necessary.

The friction surface 9 of member 10 may be preferably provided with grooves 51 to facilitate the passage of lubricant between the friction surfaces 8 and 9.

It has to be noted that the action of the shock absorber is also maintained during the return strokes of the same from the maximum positions of the impact and rebound movements to the neutral position, which is the position when the cams are in proper alignment. In other words, when for instance the maximum friction during the end of the impact movement or stroke has been reached, the friction is maintained and only gradually reduced during the return stroke to neutral position. In a like manner the friction during return stroke of the rebound movement is maintained. The shock absorber of the present invention is therefore double acting.

No servicing of the device will be required and the wear between the respective parts is practically negligible.

From the above it will be seen that the shock absorber construction described herein is of very simple construction, comprises only a few parts and may therefore be cheaply manufactured. The efficiency of the device in its shock absorbing function and its adjustability for various conditions and uses renders the same especially adaptable for the requirements of practice.

It will be apparent from the foregoing description that various changes in the details of construction of this device may be made without departing from the inventive concept, which changes will readily suggest themselves to those skilled in the art. It will be accordingly understood that it is intended and desired to embrace within the scope of this invention such modifications and changes as may be necessary to adapt it to varying conditions and uses.

Having thus described my invention, what I claim as new and desire to secure by Letters Patent of the United States, is:—

1. A shock absorber, comprising, in combination, a stationary member, a shaft rotatable within said member, a conical friction member on said shaft and longitudinally movable with respect thereto, an adjustable cam member on the stationary member, a cam member on the shaft and longitudinally movable with respect to the latter, resilient means between the conical member and the cam member on the shaft for maintaining said conical member in frictional contact with the stationary member, and means for rotating the cam member on the shaft and the conical friction member in either direction of rotation with respect to the adjustable cam member on said stationary member for producing longitudinal movement of the cam member on said shaft toward said resilient means to thereby increase the friction between the housing and conical member.

2. A shock absorber of the character described, comprising, in combination, a housing having an inner conical surface, a shaft within said housing, a conical member keyed to said shaft and longitudinally movable with respect to the same, a stationary cam on said housing, a cam keyed to the shaft and engaging said stationary cam, said cam being longitudinally movable on said shaft, a coil spring between said cam and conical member for maintaining said conical member in frictional contact with the inner conical surface of said housing, and means for rotating said shaft, cam and conical member with respect to the stationary cam for producing longitudinal movement of said cam on said shaft to compress the coil spring and to thereby increase the friction between said inner conical surface of the housing and said conical member in proportion to the longitudinal movement of the cam.

3. A shock absorber of the character described, comprising, in combination, a conical housing, a cover plate on said housing, a stationary cam carried by said cover plate, a shaft rotatable within said housing and stationary cam, a conical member keyed to said shaft and longitudinally movable with respect to the same, a second cam keyed to the shaft and longitudinally movable thereon, resilient means between said second cam and conical member for shifting said second cam into engagement with the stationary cam and for urging the conical member into frictional engagement with the conical housing, and instrumentalities for rotating said shaft, conical member and second cam and for displacing the latter with respect to the stationary cam for producing shifting of the second cam in a longitudinal direction with respect to the shaft to thereby compress the said resilient means and to shift the conical member longitudinally with respect to the conical housing to increase the frictional engagement between the latter and said conical member for resisting rotation of said shaft.

4. A shock absorber for reducing the resiliency of vehicle springs, comprising, in combination, a housing a shaft within said housing, a friction member keyed to said shaft and longitudinally movable with respect to the same, a stationary cam on said housing, a cam keyed to said shaft and longitudinally movable with respect to the same, and resilient means between said cam and friction member to maintain the said housing and friction member and said cams in frictional engagement whereby upon rotation of the shaft in one direction said cam is shifted toward the resilient means for shifting the friction member for gradually increasing the friction between the latter and said housing and whereby upon rotation of the shaft in another direction the said cam is shifted in an opposite direction for gradually decreasing the friction between the housing and said friction member.

MARTIN KESSLER.